United States Patent
Cooley (10) Patent No.: US 9,565,158 B1
(45) Date of Patent: Feb. 7, 2017

(54) SYSTEMS AND METHODS FOR AUTOMATICALLY CONFIGURING VIRTUAL PRIVATE NETWORKS

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 869 days.

(21) Appl. No.: 13/523,774

(22) Filed: Jun. 14, 2012

(51) Int. Cl.
*G06F 15/16* (2006.01)
*H04L 29/12* (2006.01)
*H04L 29/06* (2006.01)

(52) U.S. Cl.
CPC ....... *H04L 61/2015* (2013.01); *H04L 63/0272* (2013.01)

(58) Field of Classification Search
CPC .... H04L 63/0272; H04L 41/50; H04L 63/101; H04L 61/2015
USPC ......................................................... 709/203
See application file for complete search history.

(56) References Cited

U.S. PATENT DOCUMENTS

| | | | |
|---|---|---|---|
| 2002/0030751 A1* | 3/2002 | Takane | H04N 5/232 348/222.1 |
| 2005/0195780 A1* | 9/2005 | Haverinen | H04L 63/0272 370/338 |
| 2006/0206934 A1* | 9/2006 | Ammirata | 726/15 |
| 2007/0004436 A1* | 1/2007 | Stirbu | 455/503 |
| 2007/0234418 A1* | 10/2007 | Song et al. | 726/15 |
| 2009/0327714 A1* | 12/2009 | Yaghmour | H04L 12/5875 713/168 |
| 2010/0071043 A1* | 3/2010 | Babula | H04L 63/0272 726/7 |
| 2010/0299740 A1* | 11/2010 | Sheldon | H04L 63/101 726/12 |

OTHER PUBLICATIONS

Wikipedia; Universal Plug and Play; Dec. 15, 2005; http://en.wikipedia.org/wiki/Universal_Plug_and_Play.
Wikipedia; Zero Configuration Networking; Dec. 15, 2005; http://en.wikipedia.org/wiki/Zero_configuration_networking.

* cited by examiner

*Primary Examiner* — Mohammed Ahmed
(74) *Attorney, Agent, or Firm* — FisherBroyles LLP (57) ABSTRACT

A computer-implemented method for automatically configuring virtual private networks may include 1) broadcasting by a client on a network to discover a virtual private network server configured to manage virtual private networks, 2) discovering, by the client in response to the broadcast, the virtual private network server, 3) establishing a secure connection between the client and the virtual private network server in response to the discovery, and 4) receiving, by the client from the virtual private network server through the secure connection, configuration settings that enable the client to automatically connect to a virtual private network. Various other methods, systems, and computer-readable media are also disclosed.

20 Claims, 8 Drawing Sheets

SYSTEMS AND METHODS FOR AUTOMATICALLY CONFIGURING VIRTUAL PRIVATE NETWORKS

BACKGROUND

Persons and organizations frequently desire to communicate with each other over a computing network such as the Internet. Unfortunately, communications over a computing network may be compromised. For example, an unsecured communication may be read by a third party at a midpoint between the communication's source and destination. The intended parties to the communication may be unaware that the third party read the communication. The third party may also alter, redirect, or destroy the communication.

To alleviate the above problems, organizations have developed mechanisms for secured network communications. One mechanism for secured communications is a virtual private network. A virtual private network may encrypt or obscure the original communication, including its original source and destination. A virtual private network may also detect an attempt to access the communication by an unauthorized party. In response, the virtual private network may automatically reroute the communication (and future communications) and/or alter encryption or other protocols.

Unfortunately, when a user first connects to a network, the user may not be aware that a virtual private network is available. Even when the user is aware that a virtual private network is available, the user may not know how to connect to the virtual private network. The user may also be unwilling to undergo the inconvenience of manually configuring and establishing connection to the virtual private network.

SUMMARY

As will be described in greater detail below, the instant disclosure generally relates to systems and methods for automatically configuring virtual private networks.

In one example, a computer-implemented method for automatically configuring virtual private networks may include 1) broadcasting by a client on a network to discover a virtual private network server configured to manage virtual private networks, 2) discovering, by the client in response to the broadcast, the virtual private network server, 3) establishing a secure connection between the client and the virtual private network server in response to the discovery, and 4) receiving, by the client from the virtual private network server through the secure connection, configuration settings that enable the client to automatically connect to a virtual private network.

In some examples, broadcasting to discover the virtual private network server may include broadcasting using at least one of 1) broadcast packets, 2) zero configuration networking, 3) universal plug and play, and/or 4) communicating with a gateway and/or DHCP server.

In one example, establishing the secure connection may include the client providing client information that includes at least one of 1) a name of the client, 2) a device type of the client, and 3) an owner of the client. In this example, establishing the secure connection may further include presenting the client information to an administrator during an approval process. In another example, establishing the secure connection may also include presenting an option to the client to connect to the virtual private network. In one example, establishing the secure connection may also include receiving approval from an administrator for the client to receive the configuration settings. In this example, receiving approval from the administrator may include receiving the approval in response to presenting the client information to the administrator. In this example, the method may also include instructing the virtual private network server to establish the secure connection in response to receiving the approval from the administrator.

In some examples, the secure connection may encrypt communications at the transport layer. In these examples, the secure connection may use at least one of a transport layer security protocol and a secure sockets layer protocol.

In one example, establishing the secure connection may include the client transmitting a first security certificate to the virtual private network server. In this example, establishing the secure connection may also include the virtual private network server transmitting a second security certificate to the client. In this example the client and the virtual private network server may authenticate each other.

In some examples, receiving the configuration settings may include receiving 1) a username, 2) a password, 3) an internet accessible hostname, and 4) an indication of a virtual private network protocol. In these examples, the indication of the virtual private network protocol may indicate at least one of 1) a point-to-point tunneling protocol, 2) a layer 2 tunneling protocol, 3) a public key infrastructure protocol, 4) a secure socket tunneling protocol, and 5) a protected extensible authentication protocol.

In one example, the virtual private network server may be hidden from clients that establish insecure connections to the network. In this example, the virtual private network server may be hidden by a gateway limiting the networks on which the virtual private network server is discoverable. In this example, the virtual private network server may also be hidden by virtual networking.

In one embodiment, a system for implementing the above-described method may include 1) a broadcast module programmed to broadcast by a client on a network to discover a virtual private network server configured to manage virtual private networks, 2) a discovery module programmed to discover, by the client in response to the broadcast, the virtual private network server, 3) a connection module programmed to establish a secure connection between the client and the virtual private network server in response to the discovery, 4) a reception module programmed to receive, by the client from the virtual private network server through the secure connection, configuration settings that enable the client to automatically connect to a virtual private network, and 5) at least one processor configured to execute the broadcast module, the discovery module, the connection module, and the reception module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) broadcast by a client on a network to discover a virtual private network server configured to manage virtual private networks, 2) discover, by the client in response to the broadcast, the virtual private network server, 3) establish a secure connection between the client and the virtual private network server in response to the discovery, and 4) receive, by the client from the virtual private network server through the secure connection, configuration settings that enable the client to automatically connect to a virtual private network.

As will be explained in greater detail below, the systems and methods described herein may enable a client to automatically configure and/or establish a virtual private network connection. The client may automatically detect a virtual private network server. The systems and methods may then establish the virtual private network connection based on the client's previous authentication with a network (e.g., through a physical Ethernet connection or secured Wi-Fi connection). The systems and methods may thereby bring the potential for a virtual private network connection to the client's or user's attention. The systems and methods may also enable the client or user to avoid the inconvenience of being required to manually configure and establish the virtual private network connection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
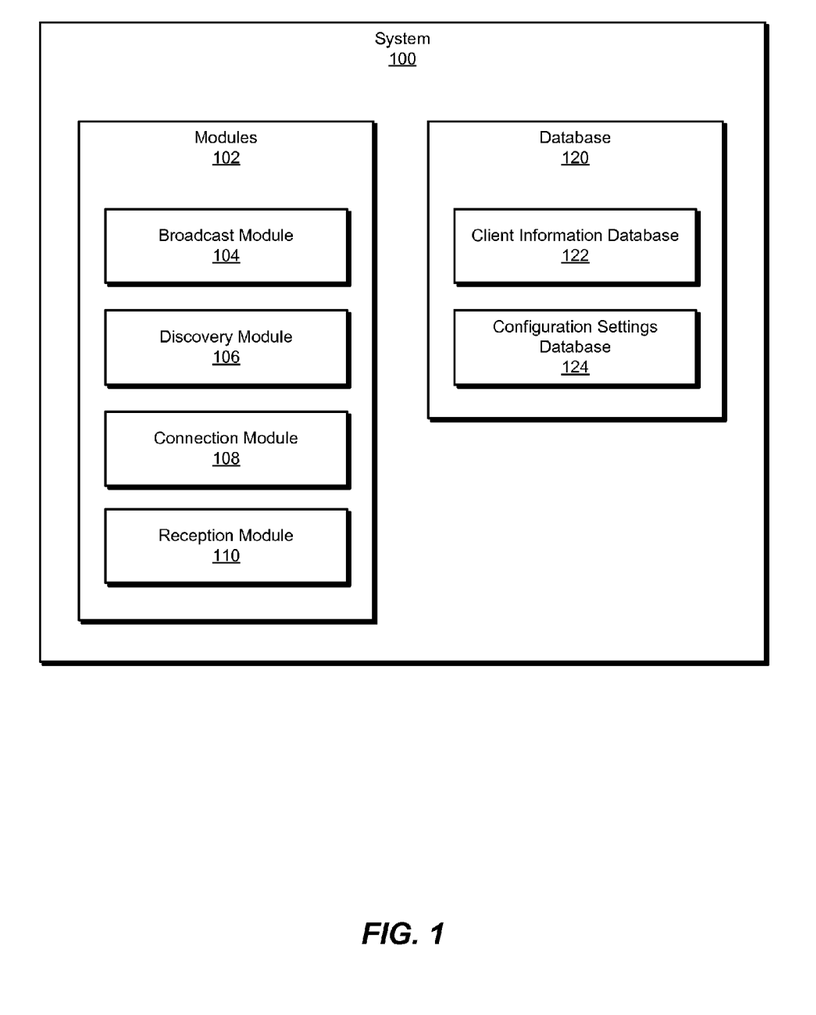
FIG. 1 is a block diagram of an exemplary system for automatically configuring virtual private networks.
Figure 2:
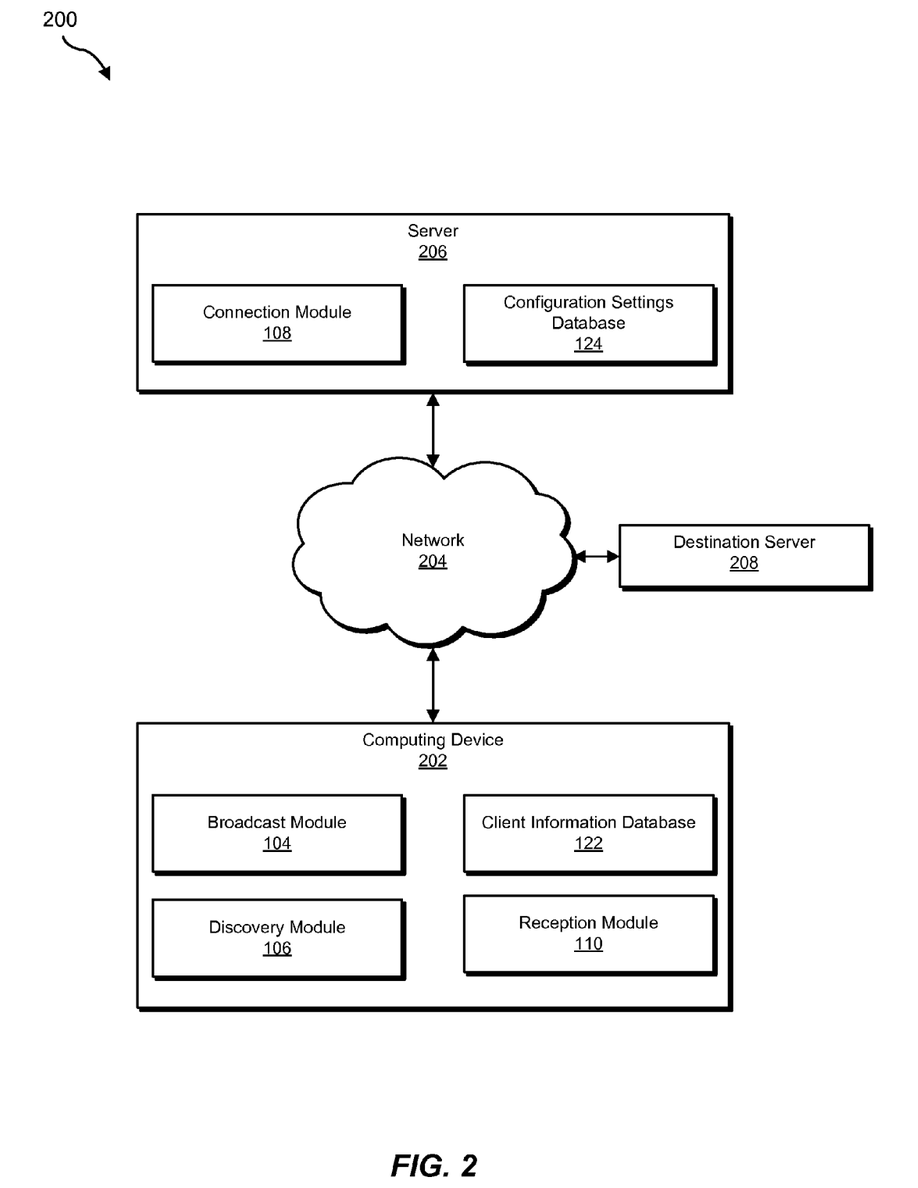
FIG. 2 is a block diagram of an exemplary system for automatically configuring virtual private networks.

The following will provide, with reference to FIGS. 1-2, detailed descriptions of exemplary systems for automatically configuring virtual private networks. Detailed descriptions of corresponding computer-implemented methods will also be provided in connection with FIG. 3. Detailed descriptions of visible servers and potential connections on a computing network will be provided in connection with FIG. 4. Detailed descriptions of a notification for a network administrator will be provided in connection with FIG. 5. Detailed descriptions of the timing of automatic connection to a virtual private network will be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for automatically configuring virtual private networks. As illustrated in this figure, exemplary system 100 may include one or more modules 102 for performing one or more tasks. For example, and as will be explained in greater detail below, exemplary system 100 may include a broadcast module 104 programmed to broadcast by a client on a network to discover a virtual private network server configured to manage virtual private networks. Exemplary system 100 may also include a discovery module 106 programmed to discover, by the client in response to the broadcast, the virtual private network server.

In addition, and as will be described in greater detail below, exemplary system 100 may include a connection module 108 programmed to establish a secure connection between the client and the virtual private network server in response to the discovery. Exemplary system 100 may also include a reception module 110 programmed to receive, by the client from the virtual private network server through the secure connection, configuration settings that enable the client to automatically connect to a virtual private network.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a client information database 122. Client information database 122 may include information about a client device that the client shares with a virtual private network server. As discussed more below, client information database 122 may include a client name, a device type of the client, and/or an owner of the client. Database 120 may also be configured to store a configuration settings database 124. Configuration settings database 124 may include a username, a password, an internet accessible hostname, and/or an indication of a virtual private network protocol.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG.

Figure 7:
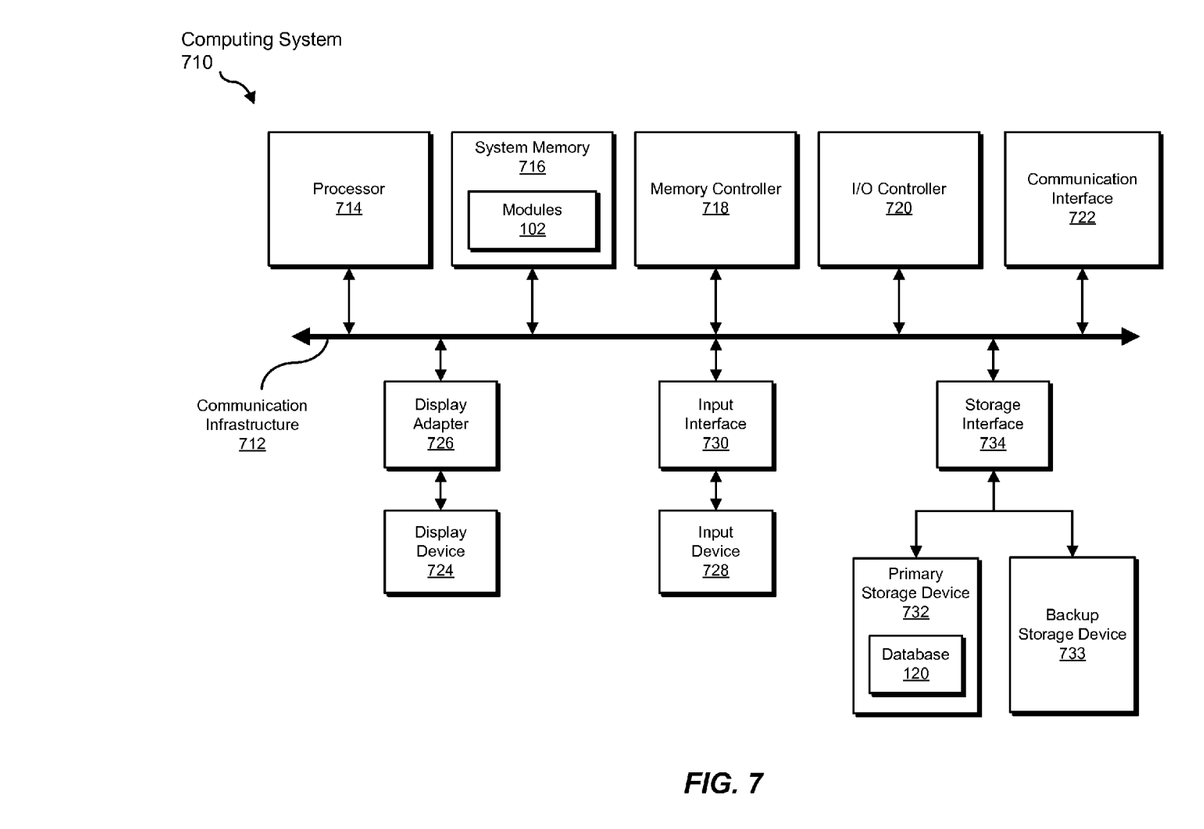
FIG. 7 is a block diagram of an exemplary computing system capable of implementing one or more of the embodiments described and/or illustrated herein.
Figure 8:
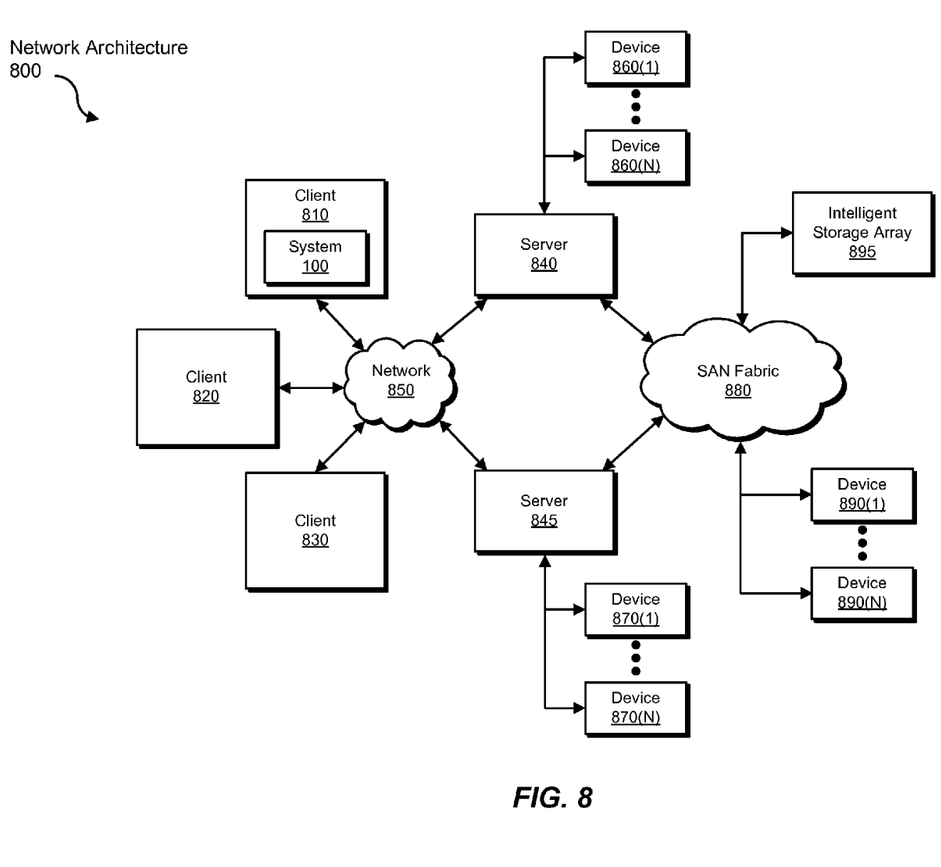
FIG. 8 is a block diagram of an exemplary computing network capable of implementing one or more of the embodiments described and/or illustrated herein.

2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to perform the function of automatically configuring virtual private networks. For example, and as will be described in greater detail below, one or more of modules 102 may cause computing device 202 to 1) broadcast by a client on a network to discover a virtual private network server configured to manage virtual private networks, 2) discover, by the client in response to the broadcast, the virtual private network server, 3) establish a secure connection between the client and the virtual private network server in response to the discovery, and 4) receive, by the client from the virtual private network server through the secure connection, configuration settings that enable the client to automatically connect to a virtual private network.

In the example of FIG. 2, computing device 202 may be configured to automatically detect server 206. Server 206 may include a discovery server that client 202 discovers using broadcast packets, zero configuration networking, universal plug and play, or any other suitable discovery mechanism. Computing device 202 may seek to discover server 206 upon connecting to network 204. Upon discovering server 206, computing device 202 may establish a secure connection with server 206. Server 206 may transmit configuration settings from configuration settings database 124 to computing device 202. Computing device 202 may then use the configuration settings to automatically establish a virtual private network with destination server 208. Although FIG. 2 shows server 206 and destination server 208 as separate, one of server 206 and destination server 208 may include the other.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of transmitting configuration settings through a secure connection. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
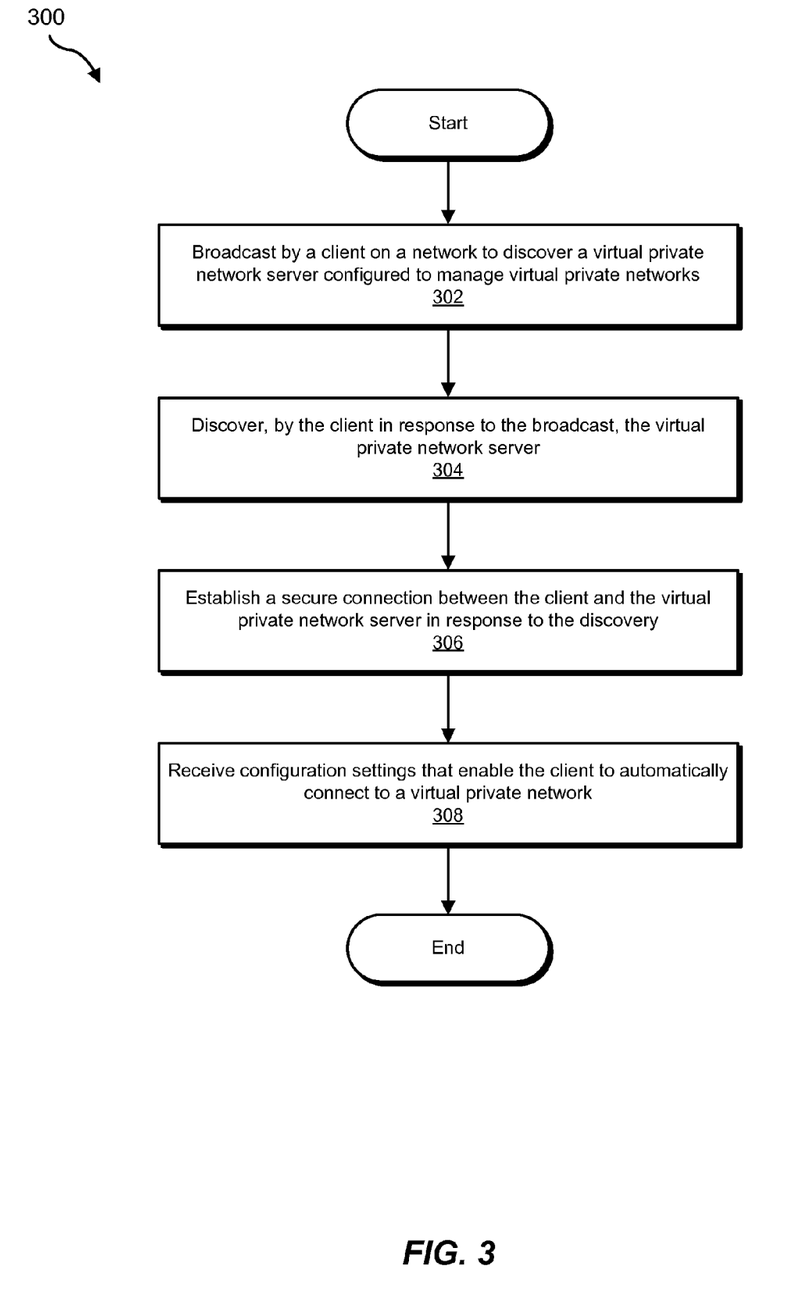
FIG. 3 is a flow diagram of an exemplary method for automatically configuring virtual private networks.

FIG. 3 is a flow diagram of an exemplary computer-implemented method 300 for automatically configuring virtual private networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the systems described herein may broadcast by a client on a network to discover a virtual private network server configured to manage virtual private networks. For example, at step 302 broadcast module 104, located on computing device 202, may broadcast on a network to discover a virtual private network server configured to manage virtual private networks. As used herein, the term "virtual private network server" is generally refers to a server that is configured to facilitate a virtual private network connection.

Broadcast module 104 may broadcast to discover a virtual private network server in a variety of manners. For example, broadcast module 104 may transmit broadcast packets on network 204. Transmitting broadcast packets may include attempting to transmit the packets to every node on network 204 within a domain, such as the broadcast domain. Broadcast module 104 may also transmit packets to discover the virtual private network server using a multicast mechanism, such as Ethernet multicast addressing, Asynchronous Transfer Mode (ATM) point-to-multipoint virtual circuits (P2MP), or Infiniband multicast. As defined herein, the term "broadcast" includes multicasting. In some embodiments, broadcast module 104 may broadcast to discover a virtual private network server by communicating with a known host, such as a gateway or a Dynamic Host Configuration Protocol (DHCP) server. Broadcast module 104 may also broadcast to discover the virtual private network server using zero configuration networking or universal plug and play.

Zero configuration networking may refer to a set of techniques that automatically create a usable Internet Protocol (IP) network without manual operator intervention or specialized configuration servers. Zero configuration networking may thereby avoid a requirement for Dynamic Host Configuration Protocol (DHCP) or Domain Name System (DNS) services, and also avoid a requirement for manual configuration of each computer in the network. Examples of zero configuration networking may include APPLE BONJOUR and AVAHI.

Universal plug and play may refer to a set of networking protocols that permit networked devices to seamlessly discover each other's presence on the network. Universal plug and play may include an extension of peripheral device plug-and-play. Universal plug and play devices may automatically establish working configurations with other devices upon being connected to the network.

In general, broadcast module 104 may broadcast a message indicating that the client is seeking to detect, identify, and/or establish a secure connection with a virtual private network server. Broadcast module 104 may include a predetermined signal or code in the broadcast that identifies the client as configured for automatic configuration and connection to virtual private networks. The virtual private network server may be configured to recognize the predetermined signal or code and respond to the broadcast message upon recognizing it.

Figure 4:
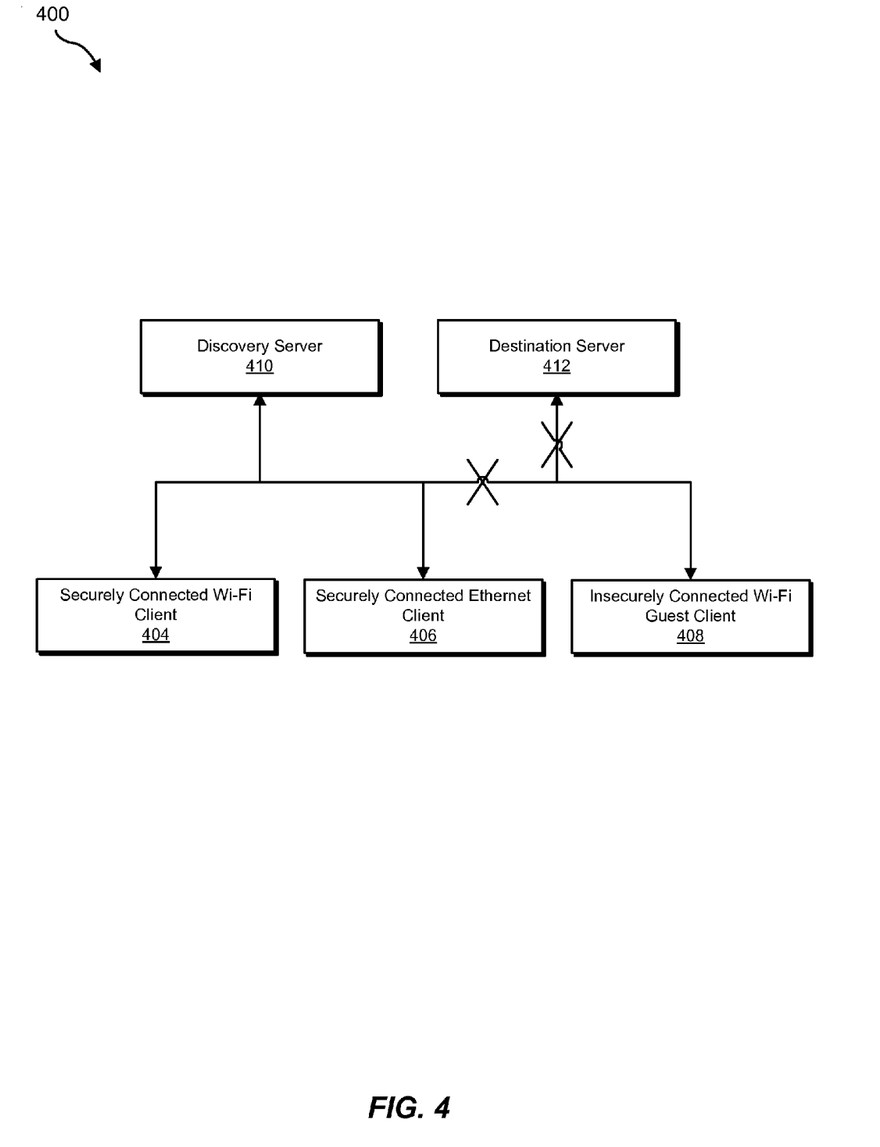
FIG. 4 is a block diagram indicating visible servers and potential connections on a computing network.

FIG. 4 is a block diagram 400 indicating visible servers and potential connections on a computing network, such as network 204. As shown in FIG. 4, broadcast module 104 may transmit packets to discover a virtual private network server, such as discovery server 410. The client may include securely connected Wi-Fi client 404, securely connected Ethernet client 406, and insecurely connected Wi-Fi guest client 408. As discussed above, the client may transmit the packets to every node on network 204 or multicast the packets to a group of target computers.

The virtual private network server may be hidden from clients that establish insecure connections to the network. The virtual private network server may be hidden by a gateway limiting the networks on which the virtual private network server is discoverable. For example, a home gateway may provide a virtual private network to a remote network. The home gateway may also process Wi-Fi connections to the home gateway. The home gateway may only make the virtual private network discoverable to securely connected Wi-Fi connections (e.g., those Wi-Fi connections that access the home gateway using a Wi-Fi password, such as a WEP or WPA password, and/or physical connections to the home gateway through an Ethernet cable). The virtual private network server may also be hidden by virtual networking. In the example of FIG. 4, both discovery server 410 and destination server 412 are hidden from insecurely connected Wi-Fi guest client 408. Destination server 412 may also be hidden from any device until the device receives configuration settings at step 308, as discussed below.

System 200 may establish criteria for distinguishing between secure and insecure connections to network 204. For example, a secure connection may include a password protected Wi-Fi connection to network 204, such as the connection to securely connected Wi-Fi client 404. A secure connection may include a physical Ethernet connection, such as the connection to securely connected Ethernet client 406. Alternatively, system 200 may impose further criteria on a physical Ethernet connection in order to designate the connection as secured (e.g., a password or physical proximity threshold).

At step 304, one or more of the systems described herein may discover, by the client in response to the broadcast, the virtual private network server. For example, at step 304 discovery module 106, located on computing device 202, may discover, by the client in response to the broadcast, the virtual private network server.

Discovery module 106 may discover the virtual private network server in a variety of manners. For example, discovery module 106 may discover the virtual private network server by receiving a reply to the broadcast at step 302. Discovery module 106 may receive the reply from the virtual private network server and/or another node on network 204. The reply may indicate the identity and location of the virtual private network server. The reply may also indicate that the virtual private network server facilitates virtual private network connections.

At step 306, one or more of the systems described herein may establish a secure connection between the client and the virtual private network server in response to the discovery. For example, at step 306 connection module 108, located on server 206, may establish a secure connection between the client and the virtual private network server in response to the discovery.

Connection module 108 may establish a secure connection between the client and the virtual private network server in a variety of manners. For example, establishing the secure connection may include the client providing client information to the virtual private network server. Client information may include a name of the client, a device type of the client, and/or an owner of the client. Client information may also include any other information suitable for authenticating the client to the virtual private network server and/or suitable for establishing a virtual private network connection. Alternatively, or additionally, the client may transmit all or part of the client information in client information database 122, located on computing device 202, as part of the original broadcast at step 302.

Figure 5:
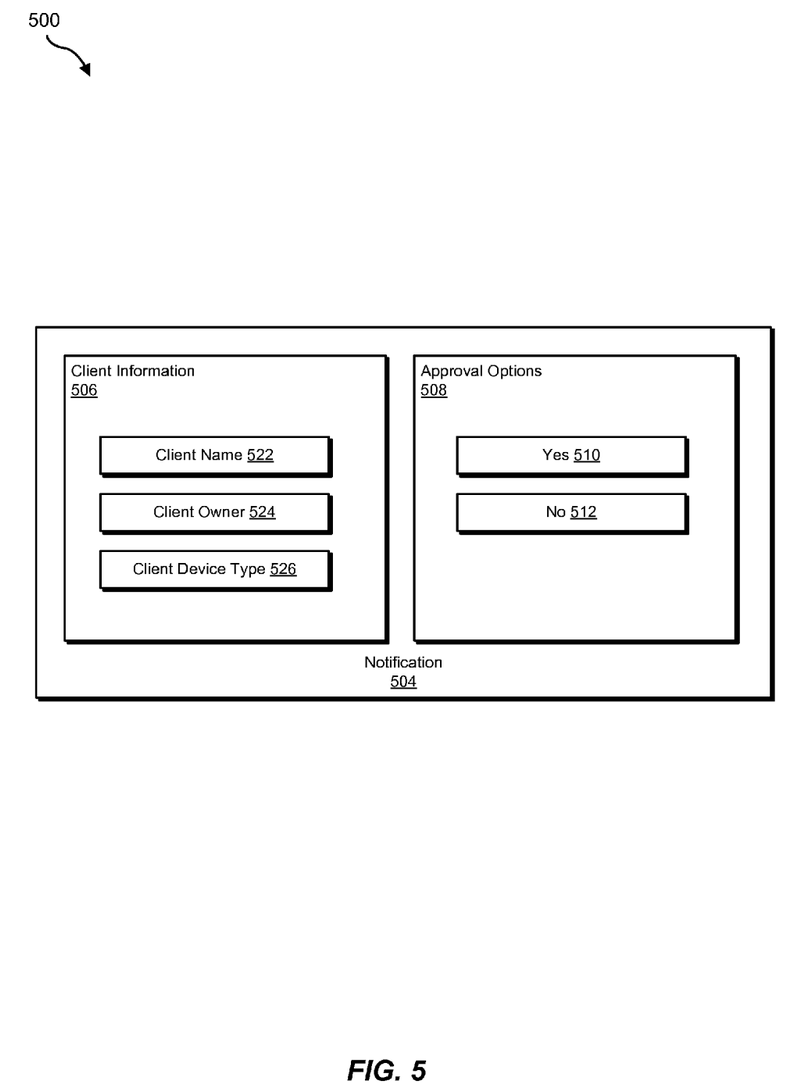
FIG. 5 is a block diagram of a notification for a network administrator.

Connection module 108 may establish the secure connection in part by presenting the client information to an administrator during an approval process. FIG. 5 is a block diagram 500 of a notification 504 for a network administrator that informs the network administrator of client information 506. Notification 504 may include a short message service (SMS) message, an email, a web-based message (e.g., a pop-up), or any other suitable form of notification. Client information 506 may correspond to client information in client information database 122. As shown in FIG. 5, notification 504 may display client information including client name 522, client owner 524, and client device type 526. Notification 504 may also display any other suitable information that helps to identify the client to the administrator, to authenticate the client, and/or to reassure the administrator that connection to the client is safe and permissible.

The administrator may receive notification 504 during an approval process that enables the administrator to approve or disapprove the secure connection with the client. The administrator may review client information 506 and base an approval decision on the information. Establishing the secure connection may include receiving approval from the administrator for the client to receive the configuration settings. Receiving approval from the administrator may include receiving the approval in response to presenting the client information to the administrator. For example, notification 504 may display approval options 508 from which the administrator may select a yes option 510 or a no option 512 to approve or disapprove the secure connection. Alternatively, the administrator may approve or disapprove the secure connection using a second and distinct notification or other user interface. Connection module 108 may instruct the virtual private network server to establish the secure connection with the client in response to receiving the approval from the administrator.

The virtual private network server (e.g., server 206) may also approve the secure connection autonomously without interaction with a network administrator. The virtual private network server may approve the secure connection based only on the client's prior secure connection to network 204 (e.g., by secured Wi-Fi and/or physical Ethernet connection). Alternatively, the virtual private network server may approve the secure connection by requiring further authentication from the client in addition to the client's prior secure connection to network 204. Upon the administrator or virtual private network server approving the secure connection, connection module 108 may present an option to the client to connect to the virtual private network.

The secure connection may encrypt communications at the transport layer. For example, the secure connection may use a transport layer security protocol or a secure sockets layer protocol. The secure connection may also, or alternatively, encrypt communications at any other suitable layer of the Open Systems Communication (OSI) model.

Connection module 108 may establish the secure connection in part by exchanging security certificates between the client and the virtual private network server. The client may transmit a first security certificate to the virtual private network server. The virtual private network server may also transmit a second security certificate to the client. The client and the virtual private network server may thereby authenticate each other.

At step 308, one or more of the systems described herein may receive, by the client from the virtual private network server through the secure connection, configuration settings that enable the client to automatically connect to a virtual private network. For example, at step 308 reception module 110, located on computing device 202, may receive, by the client from the virtual private network server through the secure connection, configuration settings that enable the client to automatically connect to a virtual private network.

Reception module 110 may receive configuration settings that enable the client to automatically connect to a virtual private network in a variety of manners. For example, reception module 110 may receive configuration settings that include a username, password, an internet accessible hostname, and an indication of a virtual private network protocol. The internet accessible hostname may identify a node or location on the internet that the client may use to access destination server 208. The indication of a virtual private network protocol may identify a protocol that specifies a type of virtual private networking, including a type of tunneling information and/or a type of encrypting information. The configuration settings may correspond to configuration settings in configuration settings database 124. The indication of a virtual private network protocol may indicate at least one of point-to-point tunneling protocol, layer 2 tunneling protocol, public key infrastructure protocol, secure socket tunneling protocol, and protected extensible authentication protocol. The configuration settings may indicate a method for tunneling traffic between the client and destination server 208. The configuration settings may also indicate whether the tunneled traffic terminates at a customer or network-provider edge, and whether the virtual private network provides site-to-site or remote-access connectivity. The configuration settings may also indicate a type or algorithm for encryption, and/or an OSI layer that the virtual private network presents to the connecting network (e.g., layer 2 or 3). In general, reception module 110 may receive the configuration settings by receiving information sufficient for the client to automatically configure and establish connection to the virtual private network without further information or requests.

Reception module 110, and system 200 more generally, may assume that the discovery server discovered at step 304 is the same as a destination server with which the client will establish a virtual private network. Alternatively, or additionally, the configuration settings may include the identity and/or location of a destination server with which the client will establish a virtual private network. The identity and/or location of the destination server may indicate that the destination server is the same or different than the discovery server. As defined herein, the term "virtual private network server" may include either or both the discovery server and the destination server.

Figure 6:
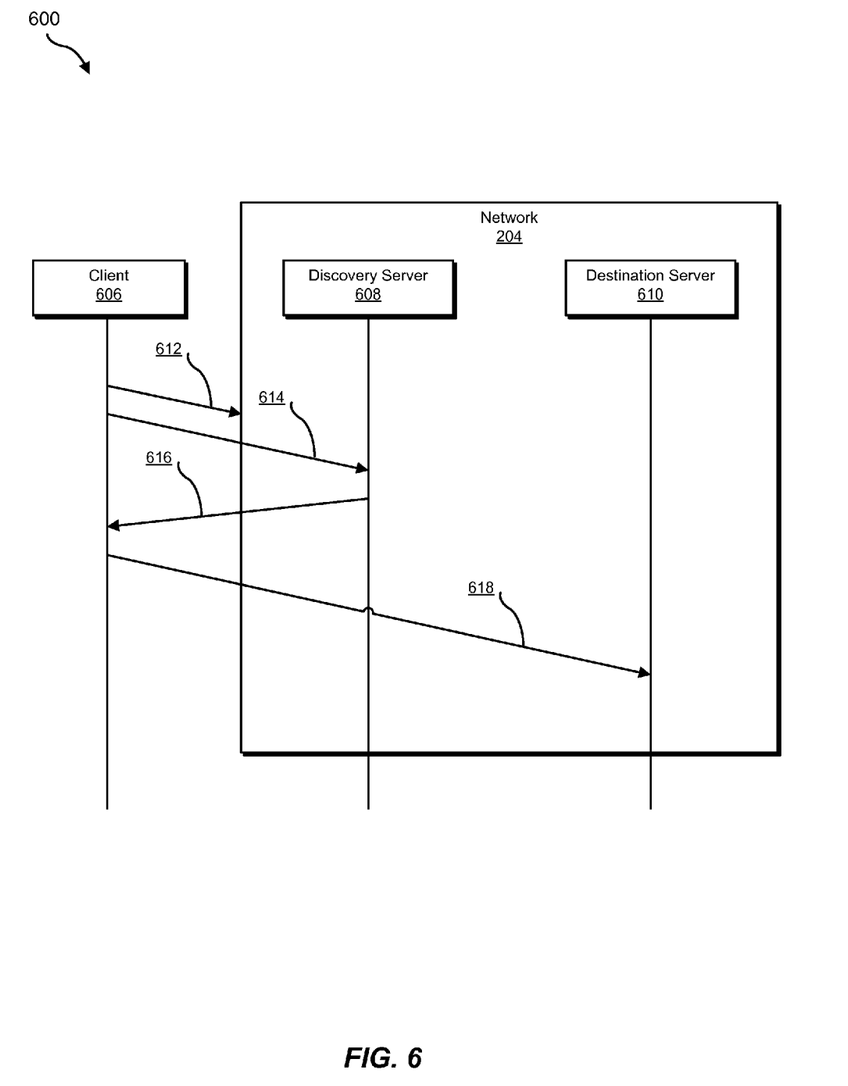
FIG. 6 is a block diagram indicating the timing for automatic connection to a virtual private network.

FIG. 6 is a block diagram 600 indicating the timing for automatic connection to a virtual private network. As shown in FIG. 6, diagram 600 includes a client 606 corresponding to computing device 202 and securely connected Wi-Fi client 404 and securely connected Ethernet client 406. Diagram 600 further includes a discovery server 608, which may correspond to server 206, and a destination server 610, which may correspond to destination server 208. Diagram 600 further includes steps 612-618. FIG. 6 provides an example showing how reception module 110 may automatically receive configuration settings for a virtual private network through a secure connection with discovery server 608. The timing for reception of the configuration settings, and/or connection to a virtual private network, may be automatic, or autonomous, in the sense that the network devices in FIG. 6 may perform one or more of steps 614-618 without user intervention in response to step 612. Step 612, which is in connection to network 204, may also optionally be performed autonomously without human intervention.

At step 612, client 606 may connect to a network such as network 204. In response to connecting to network 204, at step 614 client 606 may broadcast packets to discover a virtual private network server, such as discovery server 608. Step 614 may correspond to step 302, as discussed above. In response, at step 616, discovery server 608 may identify itself to client 606. At step 616, connection module 108 may establish a secure connection between client 606 and discovery server 608. Further at step 616, discovery server 608 may transmit configuration settings from configuration settings database 124 to client 606 through the secure connection. Step 616 may correspond to steps 304 and 306, as discussed above.

Lastly, at step 618, client 606 may use the received configuration settings to configure itself and/or establish a virtual private network connection with destination server 610. Discovery server 608 and/or destination server 610 may also configure destination server 610 using configuration settings (identical to, or corresponding to, configuration settings received by client 606) for a virtual private network connection with client 606. Configuring destination server 610 may include altering a virtual private network setting or configuration at server 610 based on the requirements, settings, profile, and/or client information of client 606. Client 606 and destination server 610 may thereby establish a virtual private network connection with each other. As discussed above, one of discovery server 608 and destination server 610 may include the other.

Discovery server 608 may manage virtual private network connections with more than one destination server. In this case, discovery server 608 may select a destination server for a virtual private network connection with client 606. Discovery server 608 may transmit configuration settings to client 606 that correspond to the configuration of the selected destination server. Discovery server 608 may select a destination server based on criteria including a degree to which a setting or profile of a candidate destination server matches client 606, a workload of client 606, a workload of a candidate destination server, and/or a past performance of a candidate destination server.

As explained in greater detail above, the systems and methods described herein may enable a client to automatically configure and/or establish a virtual private network connection. The client may automatically detect a virtual private network server. The systems and methods may then establish the virtual private network connection based on the client's previous authentication with a network (e.g., through a physical Ethernet connection or secured Wi-Fi connection). The systems and methods may thereby bring the potential for a virtual private network connection to the client's or user's attention. The systems and methods may also enable the client or user to avoid the inconvenience of being required to manually configure and establish the virtual private network connection.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the broadcasting, discovering, establishing, receiving, providing, presenting, instructing, encrypting, using, transmitting, authenticating, indicating, hiding, and limiting steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the broadcasting, discovering, establishing, receiving, providing, presenting, instructing, encrypting, using, transmitting, authenticating, indicating, hiding, and limiting steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for automatically configuring virtual private networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a client device into a state of being in a virtual private network connection with another device on a computing network.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically configuring virtual private networks, at least a portion of the method being performed by a computing device comprising at least one processor, the method comprising:
    establishing a secure connection between a client and a network by performing at least one of:
        establishing a physical Ethernet connection of the client to the network; and
        establishing an encrypted wireless local area network connection of the client to the network;
    broadcasting by the client on the network to discover a virtual private network server configured to manage virtual private networks, the virtual private network server being hidden from clients that establish unsecure connections to the network;
    discovering, by the client in response to the broadcast, the virtual private network server;
    establishing an additional secure connection between the client and the virtual private network server in response to the discovery, approval of the additional secure connection being based on the ability of the client to discover the virtual private network server that is hidden from clients that establish unsecure connections to the network;
    in response to establishing the additional secure connection between the client and the virtual private network server, receiving, by the client from the virtual private network server through the additional secure connection, configuration settings that enable the client to automatically connect to a virtual private network, the configuration settings specifying a virtual private network protocol and an internet accessible hostname that enables the client to establish the virtual private network with a destination server; and
    establishing, after establishing the additional secure connection between the client and the virtual private network server, a virtual private network connection between the client and the destination server using the received configuration settings specifying the virtual private network protocol and the internet accessible hostname.

2. The computer-implemented method of claim 1, wherein
    broadcasting comprises broadcasting using at least one of:
    broadcast packets;
    zero configuration networking; and
    universal plug and play.

3. The computer-implemented method of claim 1, wherein establishing the additional secure connection comprises the client providing client information comprising at least one of:
    a name of the client;
    a device type of the client; and
    an owner of the client.

4. The computer-implemented method of claim 3, wherein establishing the additional secure connection comprises:

presenting the client information to an administrator during an approval process.

5. The computer-implemented method of claim 1, wherein establishing the additional secure connection comprises:
presenting an option to the client to connect to the virtual private network.

6. The computer-implemented method of claim 4, wherein establishing the additional secure connection comprises:
receiving approval from the administrator for the client to receive the configuration settings.

7. The computer-implemented method of claim 6, wherein receiving approval from the administrator comprises receiving the approval in response to presenting the client information to the administrator.

8. The computer-implemented method of claim 6, further comprising instructing the virtual private network server to establish the additional secure connection in response to receiving the approval from the administrator.

9. The computer-implemented method of claim 1, wherein the additional secure connection encrypts communications at a transport layer.

10. The computer-implemented method of claim 9, wherein the additional secure connection uses at least one of a transport layer security protocol and a secure sockets layer protocol.

11. The computer-implemented method of claim 1, wherein establishing the additional secure connection comprises:
the client transmitting a first security certificate to the virtual private network server; and
the virtual private network server transmitting a second security certificate to the client, wherein:
the client and the virtual private network server authenticate each other.

12. The computer-implemented method of claim 1, wherein receiving the configuration settings comprises receiving:
a username; and
a password.

13. The computer-implemented method of claim 1, wherein the specification of the virtual private network protocol indicates at least one of:
point-to-point tunneling protocol;
layer 2 tunneling protocol;
public key infrastructure protocol;
secure socket tunneling protocol; and
protected extensible authentication protocol.

14. The computer-implemented method of claim 1, wherein
the virtual private network server is hidden by a gateway limiting networks on which the virtual private network server is discoverable.

15. The computer-implemented method of claim 1, wherein the virtual private network server is hidden by virtual networking.

16. A system for automatically configuring virtual private networks, the system comprising:
a broadcast module programmed to:
establish a secure connection between a client and a network by performing at least one of:
establishing a physical Ethernet connection of the client to the network; and
establishing an encrypted wireless local area network connection of the client to the network;
broadcast, as part of the client, on the network to discover a virtual private network server configured to manage virtual private networks, the virtual private network server being hidden from clients that establish unsecure connections to the network;
a discovery module programmed to discover, as part of the client and in response to the broadcast, the virtual private network server;
a connection module programmed to establish an additional secure connection between the client and the virtual private network server in response to the discovery, approval of the additional secure connection being based on the ability of the client to discover the virtual private network server that is hidden from clients that establish unsecure connections to the network;
a reception module programmed to receive, in response to the additional secure connection being established between the client and the virtual private network server, as part of the client and from the virtual private network server through the additional secure connection, configuration settings that enable the client to automatically connect to a virtual private network, the configuration settings specifying a virtual private network protocol and an internet accessible hostname that enables the client to establish the virtual private network with a destination server;
wherein the connection module is further programmed to establish, after establishing the additional secure connection between the client and the virtual private network server, a virtual private network connection between the client and the destination server using the received configuration settings specifying the virtual private network protocol and the internet accessible hostname; and
at least one processor configured to execute the broadcast module, the discovery module, the connection module, and the reception module.

17. The system of claim 16, wherein the broadcast module is programmed to broadcast using at least one of:
broadcast packets;
zero configuration networking; and
universal plug and play.

18. The system of claim 16, wherein the connection module is programmed to establish the additional secure connection at least in part by providing client information comprising at least one of:
a name of the client;
a device type of the client; and
an owner of the client.

19. The system of claim 18, wherein the connection module is programmed to establish the additional secure connection at least in part by:
presenting the client information to an administrator during an approval process.

20. A non-transitory computer-readable-storage medium comprising one or more computer-executable instructions that, when executed by at least one processor of a computing device, cause the computing device to:
establish a secure connection between a client and a network by performing at least one of:
establishing a physical Ethernet connection of the client to the network; and
establishing an encrypted wireless local area network connection of the client to the network;
broadcast by the client on the network to discover a virtual private network server configured to manage virtual private networks, the virtual private network server being hidden from clients that establish unsecure connections to the network;

discover, by the client in response to the broadcast, the virtual private network server;

establish an additional secure connection between the client and the virtual private network server in response to the discovery, approval of the additional secure connection being based on the ability of the client to discover the virtual private network server that is hidden from clients that establish unsecure connections to the network;

in response to establishing the additional secure connection between the client and the virtual private network server, receive, by the client from the virtual private network server through the additional secure connection, configuration settings that enable the client to automatically connect to a virtual private network, the configuration settings specifying a virtual private network protocol and an internet accessible hostname that enables the client to establish the virtual private network with a destination server; and establish, after establishing the additional secure connection between the client and the virtual private network server, a virtual private network connection between the client and the destination server using the received configuration settings specifying the virtual private network protocol and the internet accessible hostname.

* * * * *